E. J. FENN.
Horse Hay-Fork.

No. 95,012.                                            Patented Sept. 21, 1869.

Witnesses
Wm. F. Clark
Alex. F. Roberts

Inventor
E. J. Fenn
per: Munn & Co.
Attorneys

United States Patent Office.

E. J. FENN, OF MEDINA, OHIO.

Letters Patent No. 95,012, dated September 21, 1869.

---

IMPROVEMENT IN HORSE HAY-FORKS.

---

The Schedule referred to in these Letters Patent and making part of the same.

---

To all whom it may concern:

Be it known that I, E. J. FENN, of Medina, in the county of Medina, and State of Ohio, have invented a new and useful Improvement in Hay-Forks; and I do hereby declare that the following is a full, clear, and exact description thereof, which will enable others skilled in the art to make and use the same, reference being had to the accompanying drawings, forming part of this specification.

This invention relates to new and useful improvements in forks for handling hay; and consists in operating two tines, by means of a bar and lever and their connections, as hereinafter described.

In the accompanying sheet of drawings—

Similar letters of reference indicate corresponding parts.

Figure 1:
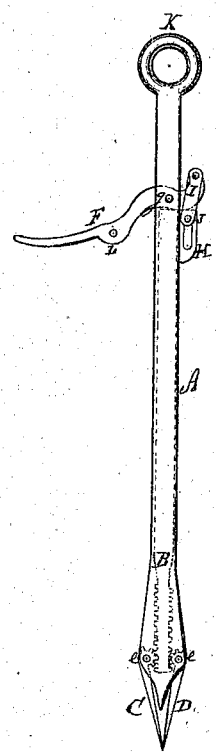
Figure 1 represents a longitudinal view of the fork, showing the tines closed.

A is the shaft, which is semi-tubular, with its lower portion expanded, to give room for the rack and sector-gears, on the ends of the bar and tines.

B is the rack-bar, which works longitudinally within the shaft A, seen in dotted lines in the drawing.

The lower portion of this bar forms a double cogged rack, which engages with the cogs on the inner ends of the tines.

C and D are the tines, which are pivoted to the expanded portion of the bar, as seen at e e.

It will be seen that when the rack-bar B is moved up and down in the shaft, the tines will, by virtue of the cogs on their ends and the double racks on the bar, be extended or closed, as seen in the drawing.

Longitudinal motion is given the rod B by means of the lever F, whose fulcrum is at g in the shaft.

H is a slotted plate on the side of the bar B, which projects from the shaft, and the lever F is connected with the bar B thereby, by means of the connecting-plates I.

The pivot J, by which those plates are connected with H, plays in the slot in the plate H.

Figure 2:
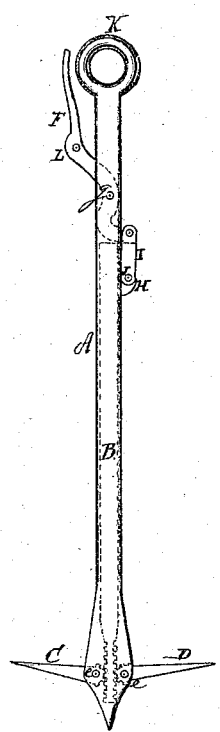
Figure 2 is a view of the fork, showing the tines extended.

In fig. 2 the tines are extended, the bar B being thrown down by elevating the lever F.

In this position the pivot J bears on the lower end of the slot, with the connecting-plates I standing parallel with the bar, and with the top end of the bar directly beneath the lower end of the lever.

In this position the fork may be lifted with the tines loaded with hay, and the tines will retain this position until the lever F is depressed, when the tines will drop and discharge their load.

The operation will be readily understood from the drawing.

One of the tines, C, is slightly longer than the other, which allows them to be extended when the fork, as seen in fig. 1, is thrust into the hay on a floor.

In mowing away hay, or in raising it for any purpose, the fork in suspended from any suitable fixture, by means of a rope passing over a pulley attached to the ring K, in the top of the shaft.

When the fork with its load has been elevated or carried to the desired position, the lever F is depressed, by means of a cord secured to the lever at L.

The pivot J of the connecting-plates I holds the tines closed when bearing upon the upper end of the slot in the rack-bar, and holds them open when bearing on its lower end, both positions being represented in the drawing.

Having thus described my invention,

I claim as new, and desire to secure by Letters Patent—

1. The lever F, in combination with the connecting-plates I and slotted plate H, arranged and operating substantially as and for the purposes described.

2. The combination of the lever F, the bar B, slotted plate H, the connecting-plates I, and the tines C D, with the shaft A, constructed, arranged, and operating substantially as and for the purposes described.

E. J. FENN.

Witnesses:
E. S. BRAINARD,
WILLIS H. ALBRO.